R. A. THOMPSON.
Draft-Equalizer.
No. 221,982.   Patented Nov. 25, 1879.
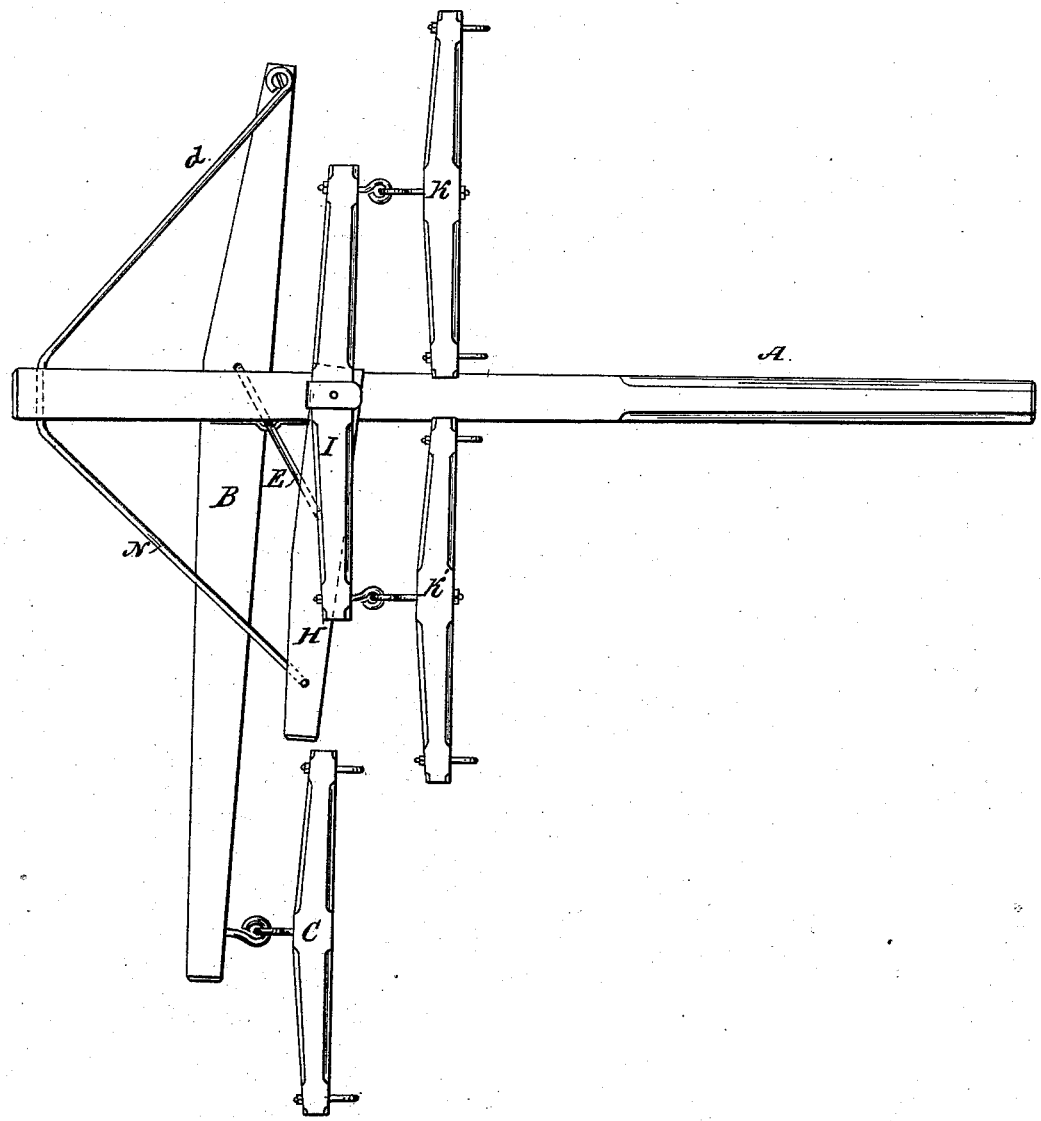

UNITED STATES PATENT OFFICE.

ROBERT A. THOMPSON, OF MONTROSE, MISSOURI.

IMPROVEMENT IN DRAFT-EQUALIZERS.

Specification forming part of Letters Patent No. 221,982, dated November 25, 1879; application filed July 9, 1879.

*To all whom it may concern:*

Be it known that I, ROBERT ALEXANDER THOMPSON, of Montrose, county of Henry, and State of Missouri, have invented an Improvement in Draft-Equalizers, of which the following description, taken in connection with the accompanying plate of drawings, hereinafter referred to, forms a full and exact specification, wherein are set forth the nature and principles of the invention, by which the same may be distinguished from others of a similar class, together with such parts thereof as are claimed as new and are desired to be secured by Letters Patent of the United States.

My invention relates to that class of devices which are made use of for equalizing the draft in vehicles; and the nature thereof consists in certain improvements in the details of the construction of the same, hereinafter shown and described.

In the accompanying plate of drawings, Figure 1 is a plan view of the apparatus.

A is the pole or tongue of the vehicle, which is connected by suitable devices to the front axle. B is a lever, having at one end thereof a swiveling single-tree, C, and connected at the other, by means of the rod $d$, with said tongue. An angular lever, E, having its fulcrum in a mounting on the side of the said pole, connects the said lever B with a lever, H, to which is pivoted a double-tree, I, carrying the swiveling single-trees K K'.

The operation of the apparatus in equalizing the draft will be obvious from the foregoing description. The draft on the double-tree I is transmitted, through the medium of the lever H—one end of which is connected by the rod N to the tongue—to the angular lever E.

Having thus described my invention, I claim and desire to secure by Letters Patent of the United States—

The lever B, having at one end thereof the swinging single-tree C, the angular lever E, the lever H, and the double-tree I, carrying the swiveling single-trees K K', all constructed and operating together as and for the purposes described.

In testimony that I claim the foregoing I have hereunto set my hand this 24th day of June, 1879.

ROBERT A. THOMPSON.

Witnesses:
JAS. H. VICKARS,
J. O. CLARK.